United States Patent

Stoler et al.

[11] Patent Number: 6,016,551
[45] Date of Patent: Jan. 18, 2000

[54] METHOD AND APPARATUS FOR MASKING AND UNMASKING A CLOCK SIGNAL IN AN INTEGRATED CIRCUIT

[75] Inventors: Gil Stoler, Kiryat Ata, Israel; Tosaki Nakanishi, Hillsboro, Oreg.

[73] Assignee: Intel Corporation, Santa Clara, Calif.

[21] Appl. No.: 08/994,303

[22] Filed: Dec. 19, 1997

[51] Int. Cl.[7] ............................. G06F 1/10; G06F 12/00
[52] U.S. Cl. ........................... 713/601; 711/146
[58] Field of Search ................... 713/322–324, 713/500, 601; 711/141, 146

[56] References Cited

U.S. PATENT DOCUMENTS

| 5,473,767 | 12/1995 | Kardach et al. | 395/550 |
| 5,481,731 | 1/1996 | Conary et al. | 395/750 |
| 5,546,568 | 8/1996 | Bland et al. | 713/601 |
| 5,603,036 | 2/1997 | Wells et al. | 713/500 |
| 5,842,005 | 11/1998 | Walsh et al. | 713/601 |

*Primary Examiner*—Thomas M. Heckler
*Attorney, Agent, or Firm*—Thomas R. Lane

[57] ABSTRACT

A microprocessor having a cache memory unit, an execution unit, and clock masking circuitry is described. Both units are responsive to a clock signal that can be masked by the clock masking circuitry in order to reduce the power consumption of the microprocessor. Based on a signal that indicates a potential impending cache snoop, the clock masking circuitry can unmask the clock signal to the cache unit without unmasking the clock signal to the execution unit.

16 Claims, 4 Drawing Sheets

METHOD AND APPARATUS FOR MASKING AND UNMASKING A CLOCK SIGNAL IN AN INTEGRATED CIRCUIT

FIELD OF THE INVENTION

The present invention relates to the field of integrated circuit design and more particularly to the field of masking clock signals in an integrated circuit.

BACKGROUND OF THE INVENTION

A prior approach to masking a clock signal in an integrated circuit is illustrated in FIG. 1. In FIG. 1, microprocessor 100 comprises cache unit 101 and execution unit 102. Both cache unit 101 and execution unit 102 are responsive to clock signal 103, i.e. both contain synchronous circuitry that is clocked by clock signal 103 or a clock signal derived from clock signal 103. More specifically, the synchronous logic in cache unit 101 is clocked directly with clock signal 103, and the synchronous logic in execution unit 102 is clocked with clock signal 104, which is derived from clock signal 103 through AND gate 105. AND gate 105 masks clock signal 103 by holding clock signal 104 low whenever active low clock mask signal 106 is asserted.

One advantage of using clock mask signal 106 to mask clock 103 is that a significant reduction in power consumption can be realized by causing clock mask signal 106 to be asserted when there is no need for execution unit 102 to be continuously clocked, such as when microprocessor 100 is idle. However, even when there is no need for execution unit 102 to be continuously clocked, cache unit 101 is continuously clocked so that cache unit 101 is ready to respond to a cache snoop request.

Therefore, in this prior approach to masking a clock signal in a integrated circuit, clock signal 103 is never masked as an input to cache unit 101, even though the masking of clock signal 103 into cache unit 101 would result in a further reduction in power consumption. If this prior approach to masking a clock signal is applied to cache unit 101, such that cache unit 101 is clocked with clock signal 104, then execution unit 102 would be unnecessarily clocked when cache unit 101, but not execution unit 102, must be ready to respond to a cache snoop request. Therefore, to allow clock signal 103 to be masked as an input to cache unit 101, a novel approach to masking a clock signal in an integrated circuit is desired.

SUMMARY OF THE INVENTION

An integrated circuit having a first unit, a second unit, and clock masking circuitry is disclosed. Both units are responsive to a clock signal that can be masked by the clock masking circuitry. Based on a signal received through a buffer on the integrated circuit and indicating that the first unit requires the clock signal, the clock signal to the first unit can be unmasked while the clock signal to the second unit remains masked.

DETAILED DESCRIPTION OF A PREFERRED EMBODIMENT

A method and apparatus for masking and unmasking a clock signal in an integrated circuit is described. In the following description, numerous specific details are set forth in order to provide a thorough understanding of the present invention. It will be apparent, however, to one skilled in the art that the present invention can be practiced without regard to these specific details. In other instances, well known circuits and design techniques have not been described in particular detail in order to avoid obscuring the present invention.

One embodiment of the present invention is described in a microprocessor having a STPCLK# buffer for receiving an externally generated STPCLK# signal that indicates a request to mask a clock signal used to clock certain synchronous circuitry within the microprocessor. One advantage of the present invention is that, compared to the prior approach described above, the present invention provides for more of the synchronous circuitry of an integrated circuit (IC) to be clocked with a masked version of the clock signal. Therefore, an even greater reduction in the power consumption of an IC can be realized. In this embodiment, a cache memory unit and an execution unit both receive a clock signal that is masked in response to an assertion of the STPCLK# signal.

The microprocessor in this embodiment also has an AHOLD buffer for receiving an externally generated AHOLD signal that indicates a request for the microprocessor to refrain from driving the address signal lines of a bus coupled to the microprocessor. One reason that AHOLD is asserted is so that another agent can drive the address signal lines as part of a request to snoop a cache memory unit within the microprocessor. One novel feature of this embodiment is that the assertion of the AHOLD signal is used as a trigger to unmask the clock signal that is received by the cache memory unit. Therefore, the cache memory unit is able to respond to a cache snoop request even though the clock to the cache memory unit is masked in response to the STPCLK# signal.

Figure 1:
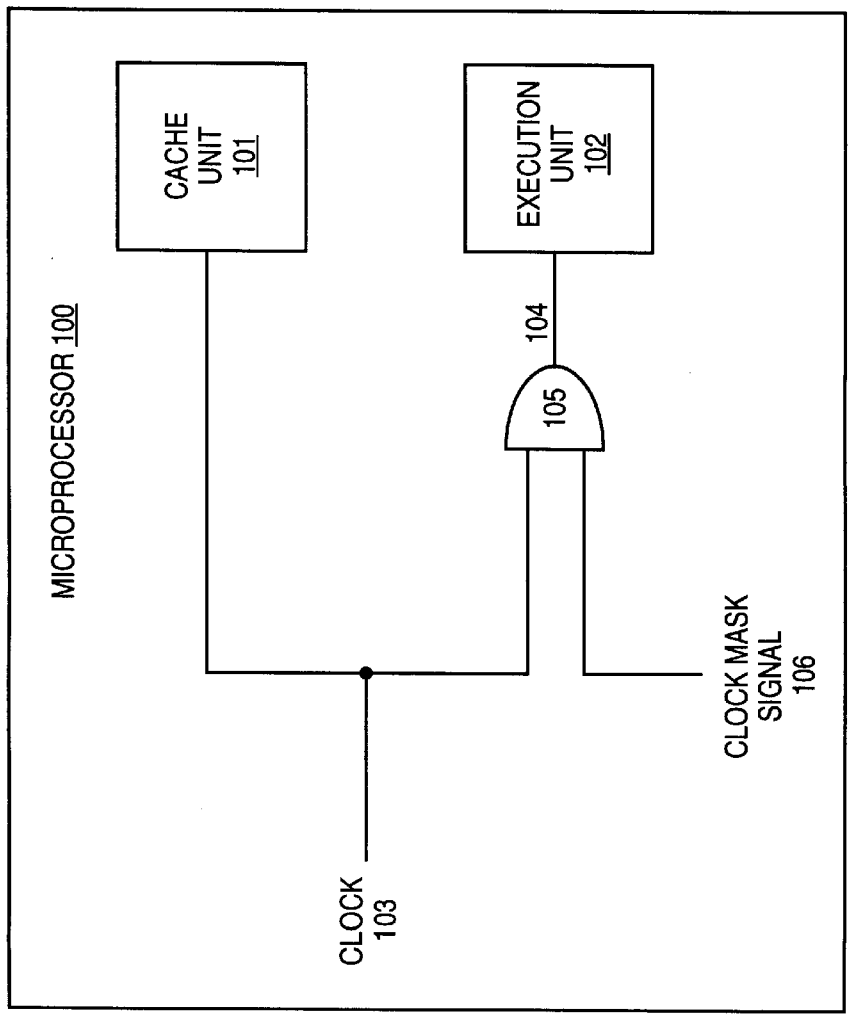
FIG. 1 is a block diagram of a microprocessor illustrating a prior approach to masking a clock signal in an integrated circuit.
Figure 2:
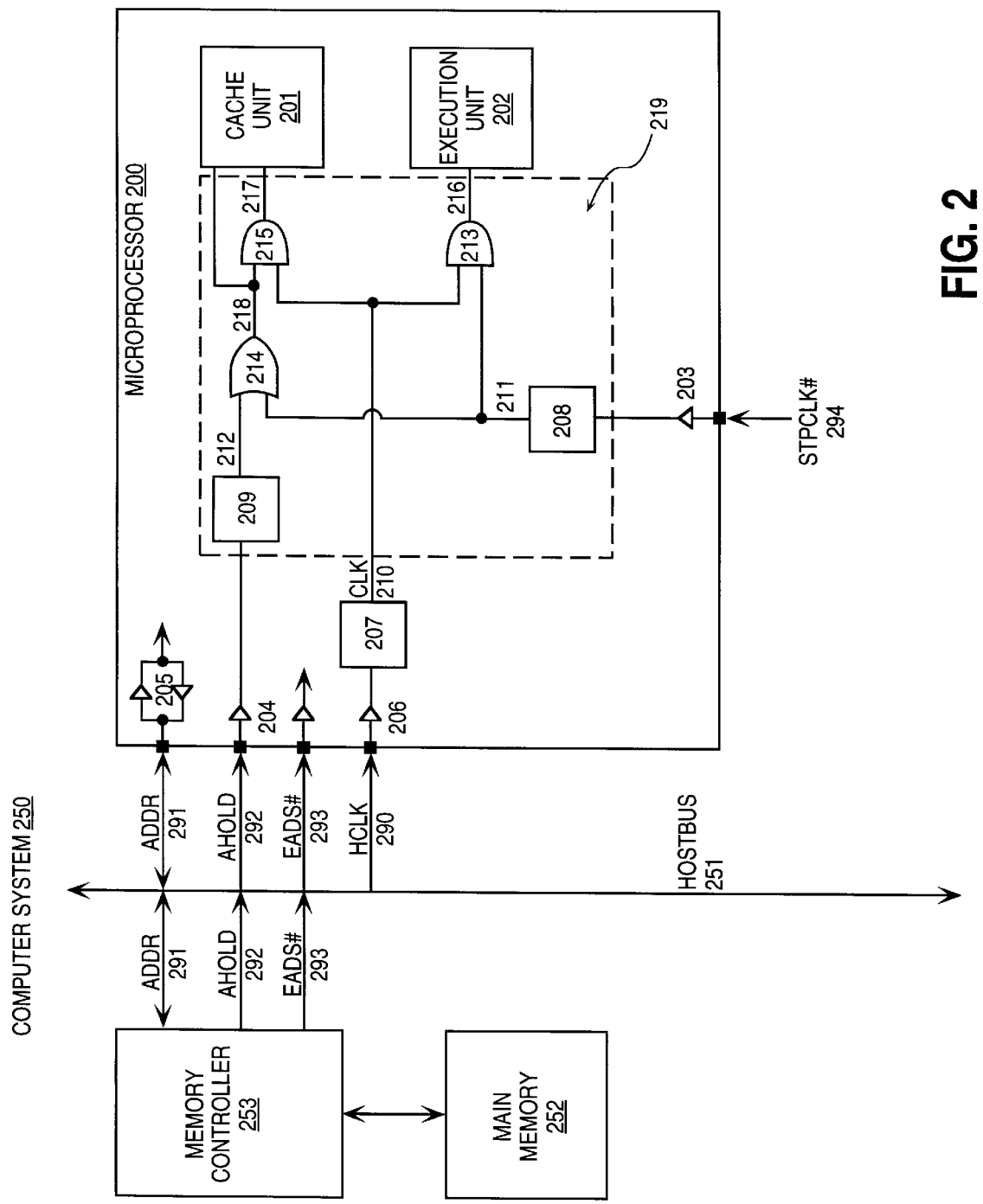
FIG. 2 is a block diagram of a microprocessor in a computer system, illustrating one embodiment of the apparatus of the present invention.

FIG. 2 illustrates an embodiment of the apparatus of the present invention in microprocessor 200 in computer system 250. Microprocessor 200 includes STPCLK# buffer 203, AHOLD buffer 204, ADDR buffer 205, and HCLK buffer 206. Buffers 203–206 each comprise an input circuit for receiving a signal from an external signal line and driving a corresponding signal to a logical high or low level within microprocessor 200. ADDR buffer 205 additionally comprises an output circuit for driving an external signal line to a logical high or low level. The output circuit within ADDR buffer 205 can be disabled to prevent ADDR buffer 205 from driving the external signal line, in which case it is said to be floating the external signal line. Thus, ADDR buffer 205 can be used to drive an address signal line of host bus 251 or to receive an address signal from an address signal line of host bus 251.

Units 201 and 202 within microprocessor 200 are blocks of circuitry implementing any function of an integrated circuit, such as decoding addresses or instructions, storing data, performing arithmetic or logical operations, or providing an interface to an external bus. There is no minimum or maximum number of gates in unit 201 or unit 202. For example, one of units 201 and 202 unit can include only a single gate while the other unit includes all of the remaining gates in a microprocessor. In this embodiment, unit 201 is a cache memory unit and unit 202 is an execution unit.

One difference between cache unit 201 and execution unit 202 is that computer system 250 supports a state in which at least one function of cache unit 201 is available for use while at least one function of execution unit 202 is not available for use. For example, in this embodiment, one function implemented by execution unit 202 is to perform an arithmetic operation, and one function implemented by cache unit 201 is support a cache snoop by checking whether cache unit 201 is currently storing data corresponding to a particular address in main memory 252. Computer system 250 supports a low power state in which microprocessor 200 is not required to perform the arithmetic operation but is required to check for an address in its cache.

Figure 3:
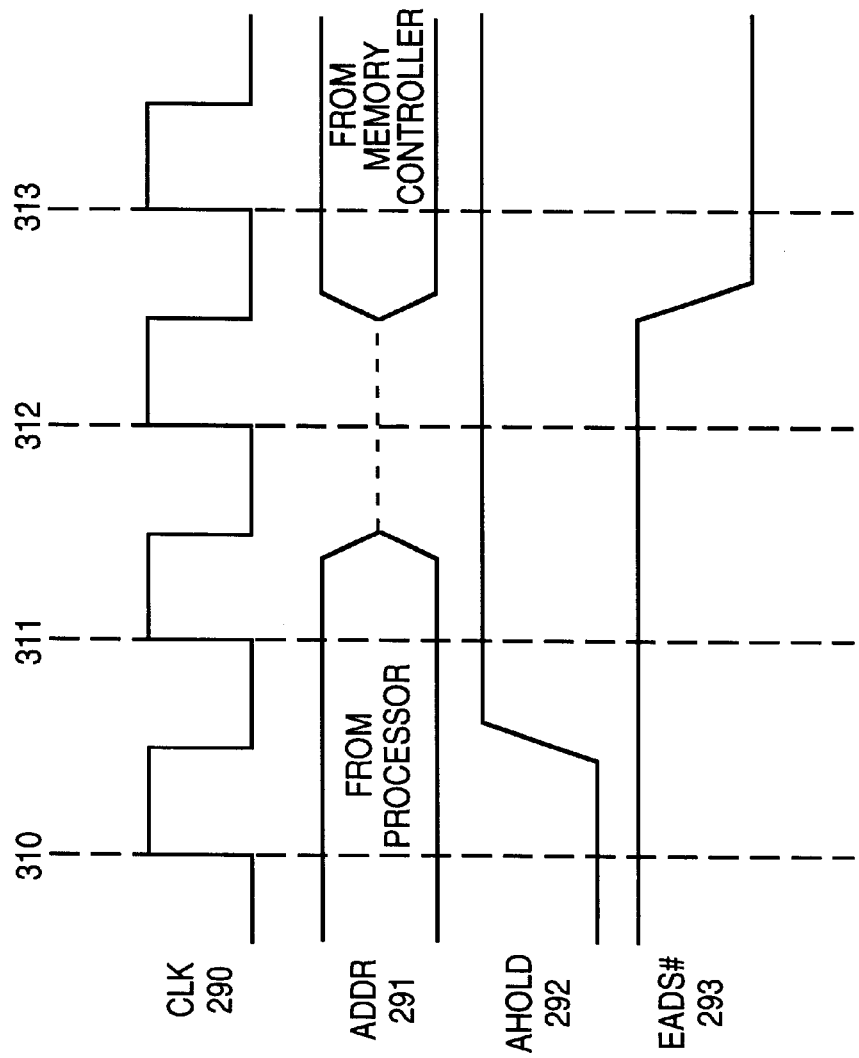
FIG. 3 is a timing diagram illustrating a portion of a cache snoop operation in the computer system of FIG. 2.

At this point, it will be instructive to describe certain details of a cache snoop protocol used within computer system 250, which comprises microprocessor 200, main memory 252, and memory controller 253. FIG. 3 is a timing diagram illustrating these details. In FIG. 3, the waveforms of three signals on host bus 251 are shown relative to HCLK signal 290, the host bus clock signal. These three signals are ADDR signal 291, AHOLD signal 292, and EADS# signal 293. ADDR signal 291 can be any of the address signals of host bus 251. ADDR signal 291 can be driven by processor 200 and received by memory controller 253, or it can be driven by memory controller 253 and received by processor 200. AHOLD signal 292 is an address hold or float signal indicating a request by any bus agent, such as memory controller 253, for processor 200 to refrain from driving the address signal lines of host bus 251, including ADDR signal 291. In the embodiment illustrated in FIGS. 2 and 3, AHOLD signal 292 is an active high signal. EADS# signal 293 is an external address strobe signal indicating that memory controller 253 is driving a valid address on the address signal lines of host bus 251, including ADDR signal 291. In the embodiment illustrated in FIGS. 2 and 3, EADS# signal 293 is an active low signal. Both AHOLD signal 292 and EADS# signal 293 are driven by memory controller 253 and received by microprocessor 200.

At time 310 in FIG. 3, microprocessor 200 is driving ADDR signal 291 either high or low. Between times 310 and 311, memory controller 253 asserts AHOLD signal 292 to indicate that memory controller intends to drive ADDR signal 291 as part of a request to snoop cache unit 201 of microprocessor 200. Microprocessor 200 samples AHOLD signal 292 asserted at time 311 and then stops driving, or floats, ADDR signal 291. Although not shown in FIG. 3, if, at time 311, microprocessor 200 is executing a current bus cycle or there is a pending bus cycle for microprocessor 200 to execute, microprocessor 200 can finish the current or pending bus cycle before microprocessor 200 stops driving ADDR signal 291. Next, as shown between times 312 and 313 in FIG. 3, memory controller 253 starts driving ADDR signal 291 either high or low. Also between times 312 and 313, memory controller 253 asserts EADS# signal 293 to indicate that memory controller 253 is driving a valid address for which microprocessor 200 should snoop cache unit 201. At time 313, microprocessor 200 samples EADS# signal 293 asserted, triggering microprocessor 200 to snoop cache unit 201.

Note that there are two periods of HCLK signal 290 between the time that microprocessor 200 samples AHOLD signal 292 asserted and the time that microprocessor samples EADS# signal 293 asserted, one period to allow microprocessor 200 to stop driving ADDR signal 291 and one period to allow memory controller 253 to start driving ADDR signal 291. Also note that although microprocessor 200 is required to support cache snooping during the low power state of computer system 250 described above, the cache snoop does not actually begin until EADS# signal 293 is sampled asserted. Therefore, AHOLD signal 292 can be used as a trigger to prepare cache unit 201 for a potential impending cache snoop.

Returning to FIG. 2, the illustrated embodiment includes PLL 207, which comprises a phase-locked loop having an input port coupled to HCLK buffer 206. In this embodiment, PLL 207 multiplies the frequency of any externally produced oscillating signal, HCLK signal 290 in this embodiment, to generate CLK signal 210. However, the source of CLK signal 210 is not limited by the present invention. For example, in another embodiment, CLK signal 210 can be received directly from an external clock source such as an IC capable of generating a clock signal.

Also in FIG. 2, clock masking circuitry 219 comprises clock mask circuit 208, clock unmask circuit 209, AND gates 213 and 215, and OR gate 214. The functions and connections of these elements will now be described.

Clock mask circuit 208 has an input port coupled to STPCLK# buffer 203 and comprises circuitry for generating active low clock mask signal 211. Clock mask circuit 208 can comprise a state machine, a microcode engine, and an interrupt prioritizer to generate clock mask signal 211 such that microprocessor 200 is always in a known state when CLK signal 210 is masked, in accordance with U.S. Pat. No. 5,473,767, entitled "Method and Apparatus for Asynchronously Stopping the Clock in a Processor", issued Dec. 5, 1995. Alternatively, clock mask circuit 208 can comprise circuitry for generating clock mask signal 211 based on STPCLK# signal 294 in accordance with any desired algorithm, or can be omitted entirely to provide for masking of CLK signal 210 based directly on STPCLK# signal 294. As a further alternative, clock mask circuit 208 can generate clock mask signal 211 based on any indication that microprocessor 200 or execution unit 201 is to enter an idle state. For example, clock mask signal 211 can be asserted based on the execution of a HALT instruction in a microprocessor produced by Intel Corporation of Santa Clara, Calif.

Clock mask signal 211 is coupled to one input port of a logic gate, AND gate 213 in this embodiment. The other input port of AND gate 213 is coupled to CLK signal 210. The output port of AND gate 213 is coupled to execution unit 202, more specifically to the clock ports, and any clock trees coupled to the clock ports, of all of the synchronous logic gates in execution unit 202. Therefore, when clock mask signal 211 is asserted (low), clock signal 216 is held low and none of the synchronous logic in execution unit 202 is clocked. Alternatively, the output port of AND gate 213 can be coupled to the clock ports, and any clock trees coupled to the clock ports, of some subset of all of the synchronous logic gates in execution unit 202, such that some portion of execution unit 202 remains operable even when clock mask signal 211 is asserted.

Clock unmask circuit 209 has an input port coupled to AHOLD buffer 204 and comprises circuitry for generating active high clock unmask signal 212. Various embodiments of clock unmask circuit 209 are possible using well known design techniques. In one embodiment, clock unmask circuit 209 can be omitted entirely such that the clock signal to cache 201 is unmasked whenever AHOLD 292 is asserted. In another embodiment, clock unmask circuit 209 can comprise synchronous or delay logic to ensure that the transition of clock unmask signal 212 does not produce a glitch in the clock signal to cache unit 201. In another embodiment, clock unmask circuit 209 can comprise circuitry to combine AHOLD signal 292 with other input signals to clock unmask circuit 209, such that the clock signal to cache 201 can be unmasked based on additional triggers. Potential additional triggers include other signals that indicate requests for microprocessor 200 to float certain signal lines of host bus 251. In a computer system wherein microprocessor 200 is microprocessor produced by Intel Corporation of Santa Clara, Calif., such signals can include HOLD, a bus hold request signal used to request that the microprocessor floats all bus signals after completing all current and pending bus cycles, and BOFF#, a backoff signal used to force the microprocessor off the bus in the next clock cycle. In another embodiment, clock unmask circuit 209 can include a programmable clock mask enable register, such that the assertion of clock unmask signal 212 is subject to programmable control. Such an embodiment of clock unmask circuit 209 provides for conditional masking of the clock to cache unit 201 based on the contents of the clock mask enable register, i.e. setting a particular bit in the clock mask enable register can cause clock unmask signal 212 to be continuously asserted, thereby preventing the masking of the clock to cache unit 201 based on the assertion of STPCLK# signal 294. Further embodiments are also possible, including embodiments that include a combination of the features of the described embodiments.

Clock unmask signal 212 is coupled to one input port of a logic gate, OR gate 214 in this embodiment. The other input port of OR gate 214 is coupled to clock mask signal 211. The output port of OR gate 214 is coupled to one input port of a logic gate, AND gate 215 in this embodiment. The other input port of AND gate 215 is coupled to CLK signal 210. The output port of AND gate 215 is coupled to cache unit 201, more specifically to the clock ports, and any clock trees coupled to the clock ports, of all of the synchronous logic gates in cache unit 201. Therefore, when clock mask signal 211 is asserted (low) and clock unmask signal 212 is unasserted (low), clock signal 217 is held low and none of the synchronous logic in cache unit 201 is clocked. Alternatively, the output port of AND gate 215 can be coupled to the clock ports, and any clock trees coupled to the clock ports, of some subset of the synchronous logic gates in cache unit 201, such that some portion of cache unit 201 remains operable even when clock mask signal 211 is asserted and clock unmask signal 212 is unasserted. As a further alternative, the output port of AND gate 215 can be coupled to the clock ports, and any clock trees coupled to the clock ports, of some subset of the synchronous logic in cache unit 201, such as the tag arrays and data paths, and the output clock of AND gate 213 can be coupled to the clock ports, and any clock trees coupled to the clock ports, of the remainder of the synchronous logic in cache unit 201, such that the tag arrays and data paths can be clocked without clocking the rest of cache unit 201.

Figure 4:
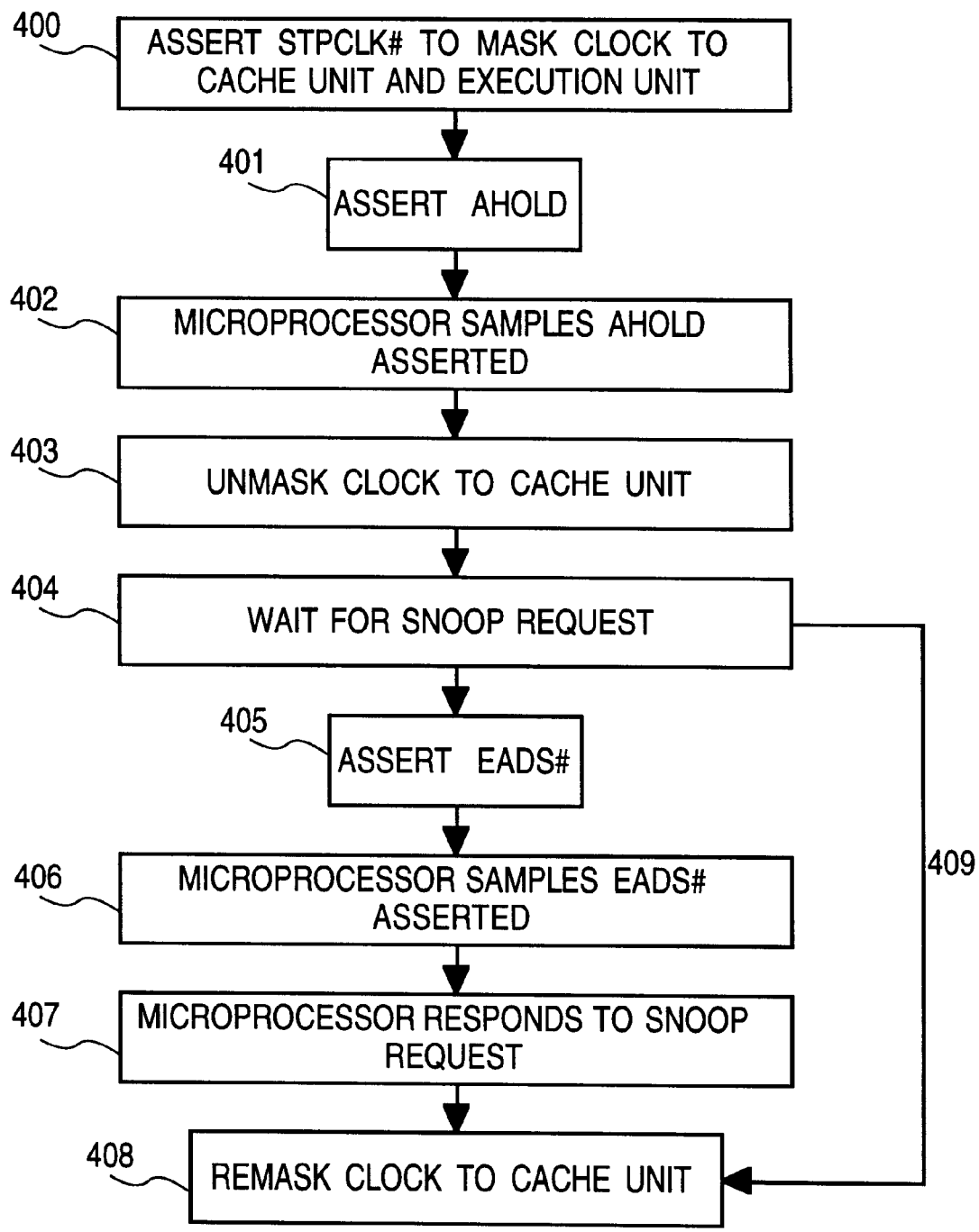
FIG. 4 is a flow diagram illustrating one embodiment of the method of the present invention.

Thus, even though the clock to cache unit 201 can be masked based on STPCLK# signal 294, cache unit 201 is still capable of responding to a snoop request as illustrated in FIG. 4. In step 400, STPCLK# signal 294 is asserted, causing clock mask signal 211 to be asserted, in turn causing the clock to execution unit 202 and cache unit 201 to be masked. In step 401, memory controller 253 asserts AHOLD signal 292. In step 402, corresponding to time 311 in FIG. 3, microprocessor 200 receives AHOLD signal 292, causing clock unmask signal 212 to be asserted. The assertion of clock unmask signal 212 causes the clock to cache unit 201 to be unmasked, as shown in step 403. In step 404, microprocessor 200 is ready and waiting for a snoop request. In step 405, memory controller 253 drives ADDR signal 291 and asserts signal EADS# 293 to request a snoop. In step 406, corresponding to time 313 in FIG. 3, microprocessor 200 receives EADS# signal 293. In step 407, microprocessor 200 responds to the snoop request. In step 408, clock unmask signal 212 is deasserted and the clock the cache unit 201 is remasked.

Within the scope of the present invention it is possible to base the unmasking of the clock signal on a signal that does not always necessitate the unmasking of the clock signal. For example, in this embodiment, the unmasking of the clock signal to cache unit 201 can be based on a BOFF# signal that has been asserted to request all bus masters to refrain from driving host bus 251. Therefore, the clock to cache unit 201 can be unmasked as shown in step 403 and microprocessor 200 can be ready and waiting for a snoop request as shown in step 404, however, a snoop request does not follow. Therefore, clock unmask signal 212 can be deasserted as shown in step 408 even though microprocessor 200 has not responded to snoop request, as shown by the transition represented by arrow 409 in FIG. 4.

The transition according to arrow 409 in FIG. 4 can be accomplished using various embodiments of clock unmask circuit 209 according to well known design techniques. In one embodiment, clock unmask circuit 209 can be omitted entirely such that the clock signal to cache 201 is remasked immediately after AHOLD signal 292 is deasserted. In another embodiment, clock unmask circuit 209 can comprise edge detect logic and synchronous delay logic to provide a timing margin between a certain event, such as the deassertion of AHOLD signal 292, and the deassertion of clock unmask signal 212. In another embodiment, clock unmask circuit 209 can comprise circuitry to deassert clock unmask signal 212 a predetermined time after clock unmask signal 212 is asserted if the assertion of another signal, such as EADS# signal 293 is not detected. Further embodiments are also possible, including embodiments that include a combination of the features of the described embodiments.

Returning to FIG. 2, cache unit 201 can also or alternatively include asynchronous circuitry such as but not limited to buffers, reference voltage generators, sense amplifiers, and dynamic nonclocked cache cells. This asynchronous circuitry is a source of static power consumption, so within the scope of the present invention it can be disabled and/or placed in a reduced power state according to any well known technique when microprocessor 200 is in a low power state. Enable signal 218 is supplied to cache unit 201 to enable this asynchronous circuitry when either clock mask signal 211 is unasserted (high) or clock unmask signal 212 is asserted (high). Enable signal 218 can also be used to enable asynchronous circuitry outside of cache unit 201. If desired, delay elements can be added between enable signal 218 and the asynchronous circuitry, or between enable signal 218 and the input of AND gate 215, such that the timing of the disabling and enabling of the asynchronous circuitry is offset relative to the masking and unmasking of the clock to cache unit 201.

Thus, an exemplary embodiment of the present invention in a microprocessor and a computer system have been described. However, the invention is not limited to the embodiment or any of the details described, such as the particular units, the particular functions, and the particular signals described. In other embodiments, unit 201 comprises a bus arbitration unit or a bus interface unit, or can comprise multiple functional units such as a cache memory unit and a bus interface unit. In another embodiment, unit 201 can comprise an integer execution unit and unit 202 can comprise a floating point execution unit.

Furthermore, the invention is not limited to use in a microprocessor, for it can be embodied in any integrated circuit or any computer system. The specification and drawings must be regarded in an illustrative rather than a restrictive sense. The scope of the invention is defined by the following claims.

What is claimed is:

1. An integrated circuit comprising:

a first unit responsive to a clock signal;

a second unit responsive to said clock signal;

a first buffer for receiving a first signal indicating when said clock signal is to be masked;

a second buffer for receiving a second signal indicating when said first unit requires said clock signal; and clock masking circuitry, coupled to said first unit, said second unit, said first buffer and said second buffer, for receiving said clock signal, masking said clock signal to said first and second units based on said first signal and unmasking said clock signal to said first unit based on said second signal while said clock signal to said second unit remains masked.

2. The integrated circuit of claim 1 further comprising a programmable clock mask enable register and wherein said clock masking circuitry conditionally masks said clock signal to said first unit based on the contents of said clock mask enable register.

3. The integrated circuit of claim 1 further comprising a phase-locked loop for generating said clock signal.

4. The integrated circuit of claim 1 wherein said first unit comprises asynchronous circuitry responsive to an enable signal generated by said clock masking circuitry.

5. An integrated circuit comprising:

a first unit comprising a cache memory, said first unit responsive to a clock signal;

a second unit responsive to said clock signal;

a buffer for receiving a second signal indicating a potential impending cache snoop; and clock masking circuitry, coupled to said first unit, said second unit and said buffer, for receiving said clock signal, masking said clock signal to said first and second units and unmasking said clock signal to said first unit based on said second signal while said clock signal to said second unit remains masked.

6. A microprocessor comprising:

a first unit responsive to a clock signal;

a second unit responsive to said clock signal;

an address buffer for driving and floating an external address signal line;

a float buffer for receiving a float signal indicating when said address buffer is to float said external address signal line; and clock masking circuitry, coupled to said first unit, said second unit, said address buffer and said float buffer, for receiving said clock signal, masking said clock signal to said first and second units and unmasking said clock signal to said first unit based on said float signal while said clock signal to said second unit remains masked.

7. The microprocessor of claim 6 wherein said first unit comprises a cache memory unit.

8. The microprocessor of claim 6 wherein said second unit comprises an execution unit.

9. The microprocessor of claim 6 further comprising a clock mask buffer for receiving a clock mask request signal indicating when said clock signal is to be masked.

10. The microprocessor of claim 6 wherein said clock signal is masked based on an indication that said microprocessor is to enter an idle state.

11. The microprocessor of claim 10 wherein said indication that said microprocessor is to enter an idle state is based on an instruction executed by said microprocessor.

12. A computer system comprising:

a bus comprising an address signal line;

a first agent coupled to said bus and comprising an output buffer for driving a float signal indicating when said first bus agent is to drive said address signal line; and a second agent coupled to said bus and comprising:

a first unit responsive to a clock signal;

a second unit responsive to said clock signal;

an address buffer for driving said address signal line;

a bus float buffer for receiving said float signal; and clock masking circuitry, coupled to said first unit, said second unit, said address buffer and said bus float buffer, for receiving said clock signal, masking said clock signal to said first and second units and unmasking said clock signal to said first unit based on said float signal while said clock signal to said second unit remains masked.

13. The computer system of claim 12 wherein:

said first unit of said second bus agent comprises a cache memory; and said first bus agent asserts said float to initiate a cache snoop request.

14. A method of masking and unmasking a clock signal in an integrated circuit comprising a first and a second unit, said method comprising:

masking said clock signal to said first and second units;

receiving a signal indicating that said integrated circuit is to float an external address signal line; and unmasking said clock signal to said first unit based on said signal while said clock signal to said second unit remains masked.

15. A method of masking and unmasking a clock signal in an integrated circuit comprising a cache unit and an execution unit, said method comprising:

masking said clock signal to said cache unit and said execution unit;

receiving a signal indicating that said integrated circuit is to float an external address signal line;

unmasking said clock signal to said cache unit based on said signal while said clock signal to said execution unit remains masked;

waiting for a cache snoop request from an external bus agent; and remasking said clock signal to said cache unit.

16. The method of claim 15 further comprising a step of responding to said cache snoop request prior to said step of remasking said clock signal to said cache unit.

* * * * *

UNITED STATES PATENT AND TRADEMARK OFFICE
CERTIFICATE OF CORRECTION

PATENT NO. : 6,016,551
DATED : January 18, 2000
INVENTOR(S) : Stoler et al.

It is certified that error appears in the above-identified patent and that said Letters Patent is hereby corrected as shown below:

Title page, item [75], inventors: replace "Tosaki" with Tosaku--.

Signed and Sealed this

Third Day of October, 2000

Q. TODD DICKINSON

*Attest:*

*Attesting Officer*  *Director of Patents and Trademarks*